(12) United States Patent
Lee

(10) Patent No.: US 6,588,545 B1
(45) Date of Patent: Jul. 8, 2003

(54) MUFFLER FOR INTERNAL COMBUSTION ENGINE

(75) Inventor: Ok-no Lee, Hyundae 3rd Apt 302-202, 285 Songchun-dong 2, Duckjin-ku, Chonju-shi, Chonlabuk-do 561-820 (KR)

(73) Assignee: Ok-no Lee, Chanju-Shi (KR)

(*) Notice: Subject to any disclaimer, the term of this patent is extended or adjusted under 35 U.S.C. 154(b) by 0 days.

(21) Appl. No.: 09/889,861

(22) PCT Filed: Jan. 14, 2000

(86) PCT No.: PCT/KR00/00018

§ 371 (c)(1),
(2), (4) Date: Jul. 23, 2001

(87) PCT Pub. No.: WO00/46491

PCT Pub. Date: Aug. 10, 2000

(30) Foreign Application Priority Data

Feb. 5, 1999 (KR) .......................... 1999-4053

(51) Int. Cl.[7] .............................................. F01N 001/08
(52) U.S. Cl. ...................... 181/264; 181/279; 181/280
(58) Field of Search ................... 181/264, 279, 181/280

(56) References Cited

U.S. PATENT DOCUMENTS

| | | | | |
|---|---|---|---|---|
| 3,648,802 A | * | 3/1972 | Pierce ........................ | 181/227 |
| 3,946,830 A | * | 3/1976 | Kutney et al. ............. | 137/15.1 |
| 4,050,913 A | * | 9/1977 | Roach ......................... | 181/210 |
| 4,074,975 A | * | 2/1978 | Tokura et al. .............. | 181/272 |
| 4,217,756 A | * | 8/1980 | Laskody ...................... | 181/219 |
| 4,685,534 A | * | 8/1987 | Burstein et al. ............ | 181/251 |
| 5,517,865 A | * | 5/1996 | Wisler et al. ............... | 181/215 |

FOREIGN PATENT DOCUMENTS

| | | |
|---|---|---|
| JP | 56-132307 | 10/1981 |
| JP | 57-101314 | 6/1982 |
| JP | 61-142118 | 9/1986 |
| KR | 85-1788 | 4/1985 |

OTHER PUBLICATIONS

Maleev, V.L., "Internal Combustion Engines", 2nd ed., McGraw Hill Book Co., New York, 1945, 343–344.

* cited by examiner

Primary Examiner—Kimberly Lockett
(74) Attorney, Agent, or Firm—Hedman & Costigan, P.C.

(57) ABSTRACT

A muffler for an internal combustion engine, capable of sufficiently attenuating exhaust sound and preventing power output from being reduced by allowing exhaust gas to flow without a hitch and generating vortices. The muffler comprises a casing, a vortex diffusing member, a vortex generating cylinder, and a vortex generating member. The vortex diffusing member is mounted in the casing and is connected to an exhaust inlet pipe. The vortex generating cylinder is positioned in the casing at its first side and is protruded into the exterior at its second side, and is provided with a tail pipe at its exterior end. The vortex generating member is axially mounted in the vortex generating cylinder.

13 Claims, 4 Drawing Sheets

MUFFLER FOR INTERNAL COMBUSTION ENGINE

TECHNICAL FIELD

The present invention relates, in general, to a muffler and, more particularly, to a muffler for an internal combustion engine, capable of attenuating exhaust sound sufficiently and preventing power output from being reduced, by allowing exhaust gas to flow without a hitch and generating vortices.

BACKGROUND ART

As well known to those skilled in the art, since exhaust gas discharged from an exhaust manifold has a high temperature of 600 to 800° C. and a high pressure of 3 to 5 kg/cm$^2$, explosive sound occurs and fire may occur due to the abrupt expansion of the exhaust gas, when the exhaust gas is directly discharged from the exhaust manifold to the atmosphere. In order to overcome such problems, an exhaust inlet pipe is connected to the exhaust manifold and a muffler for an internal combustion engine is connected to the exhaust pipe, so that the temperature and the pressure of the exhaust gas are reduced, thereby attenuating the exhaust sound.

Various types of mufflers for an internal combustion engine are proposed. Of the mufflers, an expansion-type muffler and an expansion and resonator-type muffler are widely used. According to the expansion-type muffler, the interior of a casing is divided by a plurality of partitions so as to form a plurality of expansion chambers and the expansion chambers are in communication with each other through a plurality of conduits each having small diameters. Therefore, exhaust gas repeats expansion and acceleration, so that sound waves are interfered and the temperature and the pressure of the exhaust gas are reduced, thereby attenuating the exhaust sound. According to the expansion and resonator-type muffler, one of the expansion chambers of the expansion-type muffler is assigned to a resonance chamber. Therefore, in the expansion chamber the exhaust sound is attenuated in the same way as that of the expansion-type muffler, and in the resonance chamber the resonance of the sound wave of a specific frequency is suppressed, thereby attenuating the exhaust sound of the specific frequency.

However, according to the conventional mufflers, since the temperature and the pressure of the exhaust gas are reduced while exhaust gas passes through the expansion chambers and the conduits, large flow resistance occurs. When the large flow resistance occurs, sound attenuation is satisfactory, but back pressure, which is the resistance imposed on exhaust stroke, is increased.

Since the back pressure reduces volume efficiency by increasing the density of exhaust gas remaining in a combustion chamber, there occur problems in which power output is reduced and the quantity of consumed fuel is increased.

DISCLOSURE OF THE INVENTION

Accordingly, the present invention has been made keeping in mind the above problems occurring in the prior art, and an object of the present invention is to provide a muffler for an internal combustion engine, capable of attenuating exhaust sound sufficiently and preventing power output from being reduced, by allowing exhaust gas to flow without a hitch and generating vortices.

Another object of the present invention is to provide a muffler for an internal combustion engine, capable of reducing carbon smoke at low cost when diesel fuel is used as well as attenuating exhaust sound sufficiently and preventing power output from being reduced.

In order to accomplish the above object, the present invention provides a muffler for an internal combustion engine, comprising a casing, a vortex diffusing means mounted in the casing and connected to an exhaust inlet pipe, a vortex generating cylinder positioned in the casing at its first side and protruded into the exterior at its second side, and provided with a tail pipe at its exterior end, and a vortex generating member axially mounted in the vortex generating cylinder.

The present invention also provides a muffler for an internal combustion engine, comprising a casing, a vortex diffusing means mounted in the casing and connected to an exhaust inlet pipe, a vortex generating cylinder positioned in the casing at its first side and protruded into the exterior at its second side, and provided with a tail pipe at its exterior end, and a heater provided at the exterior end portion of the vortex generating cylinder.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
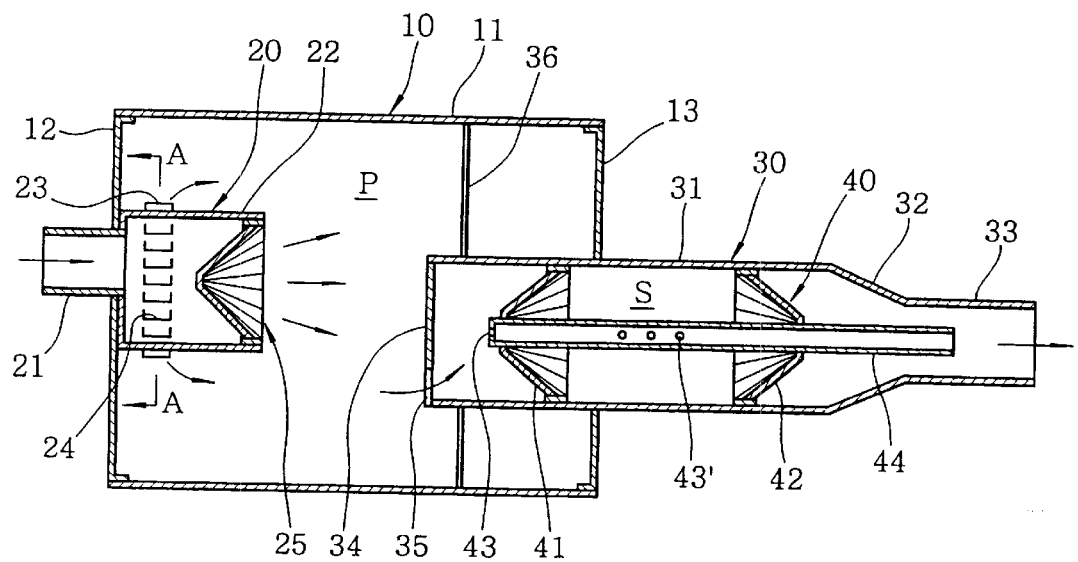
FIG. 1 is a cross section showing a muffler for an internal combustion engine according to a first embodiment of the present invention.

FIG. 1 is a cross section showing a muffler for an internal combustion engine according to a first embodiment of the present invention. The muffler for an internal combustion engine comprises a casing 10, a vortex diffusing means 20, a vortex generating cylinder 30 and a vortex generating member 40.

The casing 10 consists of a sidewall 11 that has a circular or elliptical cross section, and a front end plate 12 and a rear end plate 13 that respectively blocks both openings of the sidewall 11, thereby defining an expansion chamber P in its interior.

Figure 2:
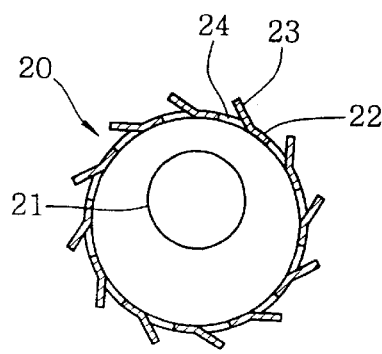
FIG. 2 is a cross section taken along a line A—A of FIG. 1.
Figure 3:
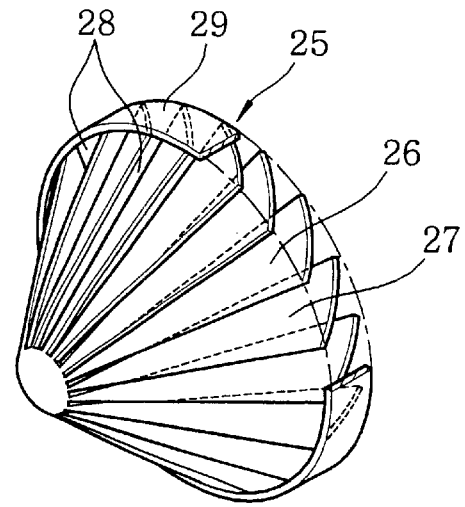
FIG. 3 is a perspective view showing a conical vortex generating member of the present invention.
Figure 4:
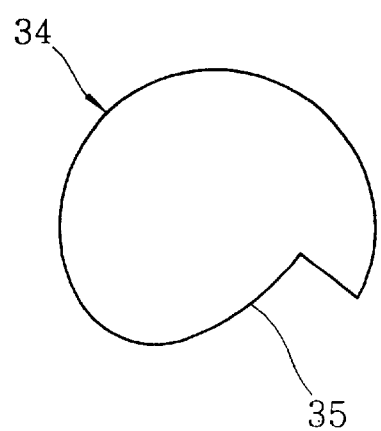
FIG. 4 is a side view showing a pressure reduction plate of the present invention.

The vortex diffusing means 20 consists of a diffusion cylinder 22 that is connected to the interior end of an exhaust inlet pipe 21 and a conical vortex generating member 25 that is mounted in the interior end portion of the diffusion cylinder 22. As shown in FIG. 2, the diffusion cylinder 22 is provided along its circumference with a plurality of guide flaps 23 that are cut and bent toward the tangential direction, so that the guide flaps 23 respectively form a plurality of diffusion holes 24. As shown in FIG. 3, the conical vortex generating member 25 comprises a plurality of twisted blades 26 and 27 that are inwardly radially raised and are radially arranged at regular intervals so as to form passages between all neighboring blades 26 and 27 and a ring frame 29 that is disposed around the exterior edges of the twisted blades 26 and 27. According to the vortex diffusing means 20, a portion of the exhaust gas entering through the exhaust inlet pipe 21 is discharged through the diffusion holes 24, then flows vertically around the diffusion cylinder 22 by means of the guide flaps 23, and finally is discharged into the expansion chamber P, resulting in being expanded. On the other hand, the rest of the exhaust gas flows vertically while flowing through the passages 28 between the twisted blades 26 and 27, and finally is discharged into the expansion chamber P, resulting in being expanded.

The vortex generating cylinder 30 consists of a cylinder 31, a tapered cylinder 32 that is connected to the cylinder 31 and becomes narrow toward the rear, a tail pipe 33 that is connected to the tapered cylinder 32 and has a relatively small diameter, and a pressure reduction plate 34 that has an opening 35 and is vertically fixed to the interior end of the cylinder 31 while the opening 35 is positioned down. The vortex generating cylinder 30 is mounted to be protruded into the expansion chamber P by means of a support bar 36. The vortex generating cylinder 30 is preferably mounted through a downwardly offset position of the rear end plate 13.

The vortex generating member 40 comprises a pair of conical vortex generating members 41 and 42 that each have a construction similar to that of the conical vortex generating member 25 and a support and discharge pipe 44 that has holes 43 and 43' and is inserted into and supports the center portions of the conical vortex generating members 41 and 42. The conical vortex generating members 41 and 42 are supported by the support and discharge pipe 44 so that they are spaced apart from each other so as to form a vortex generating space S between them and their wider sides confront each other.

According to the vortex generating cylinder 30 and the vortex generating member 40, a small amount of the exhaust gas from the expansion chamber P flows into the vortex generating cylinder 30 through the opening 35 and then is discharged to the atmosphere through the support and discharge pipe 44, the pressure of this exhaust gas being reduced in the process of passing through the opening 35. On the other hand, the rest of the exhaust gas from the expansion chamber P flows vortically while flowing through the vortex generating member 41, the vortex generating space S and the conical vortex generating member 42, and then is discharged into the atmosphere, this exhaust gas being expanded in the process of passing through the vortex generating member 41, the vortex generating space S and the conical vortex generating member 42.

Although the number of the conical vortex generating members 41 and 42 illustrated in FIG. 1 is two, the number of the conical vortex generating members should be determined in accordance with fuel in use and the compression ratio of an internal combustion engine. However, in order to attenuate the exhaust sound sufficiently, two or more conical vortex generating members should be used.

The operation of the first embodiment of the present invention is described in the following.

The exhaust gas enters the diffusion cylinder 22 through the exhaust inlet pipe 21.

A portion of the exhaust gas entering through the exhaust inlet pipe 21 is discharged through the diffusion holes 24 and then moves toward the sidewall 11 of the casing 10 while flowing vortically around the diffusion cylinder 22 by means of the guide flaps 23, resulting in being expanded. On the other hand, the rest of the exhaust gas entering through the exhaust inlet pipe 21 moves toward the center portion of the expansion chamber P while flowing vertically through the passages 28 between the twisted blades 26 and 27 of the conical vortex generating member 25, resulting in being expanded.

A small amount of the exhaust gas from the expansion chamber P flows into the vortex generating cylinder 30 through the opening 35 and then is discharged to the atmosphere through the support and discharge pipe 44, the pressure of the exhaust gas being reduced in the process of passing through the opening 35. On the other hand, the rest of the exhaust gas from the expansion chamber P flows vortically while flowing through the vortex generating member 41, the vortex generating space S and the conical vortex generating member 42 and then is discharged into the atmosphere, the exhaust gas being expanded in the process of passing through the vortex generating member 41, the vortex generating space S and the conical vortex generating member 42.

Incidentally, condensed water, which is gathered on the floor of the casing when the exhaust gas flows from the expansion chamber P to the vortex generating cylinder 3, flows into the vortex generating cylinder 3 together with the exhaust gas, and then is discharged to the atmosphere by means of suction force that is generated by the increased speed of the exhaust gas through the opening 35. As a result, the condensed water is discharged well and the durability of the muffler is improved.

Figure 5:
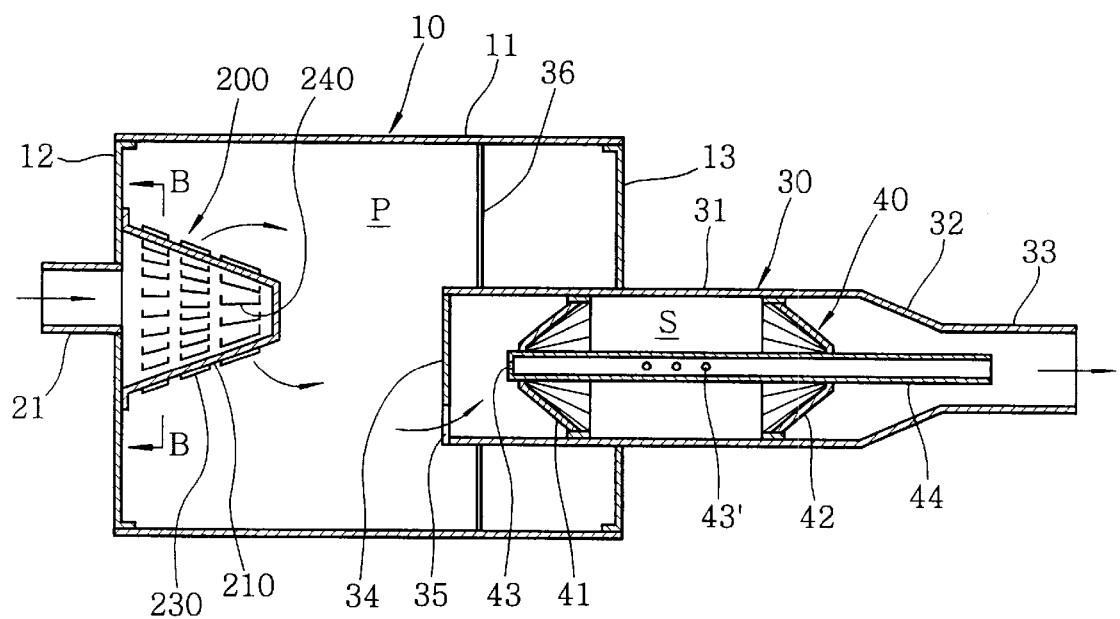
FIG. 5 is a cross section showing a muffler for an internal combustion engine according to a second embodiment of the present invention.
Figure 6:
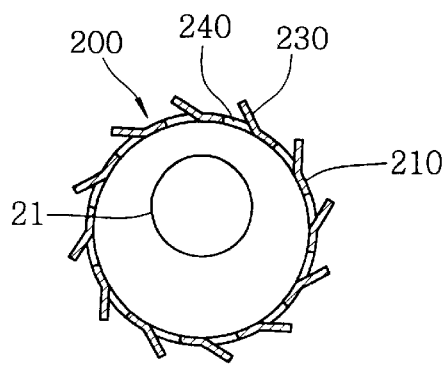
FIG. 6 is a cross section taken along a line B—B of FIG. 5.

FIG. 5 is a cross section showing a muffler for an internal combustion engine according to a second embodiment of the present invention. Since a casing 10, a vortex generating cylinder 30 and a vortex generating member 40 of this embodiment respectively are identical to the casing 10, the vortex generating cylinder 30 and the vortex generating member 40 of the first embodiment in construction, the same reference numerals used to designate the components of the first embodiment are used to designate the corresponding identical components of this embodiment and the descriptions of the corresponding identical components of this embodiment are omitted. A vortex diffusing means 200 comprises a truncated cone-shaped diffuser 210. As shown in FIG. 6, the cone-shaped diffuser 210 is provided along its circumference with multiple lines of multiple guide flaps 230 that are cut and bent toward the tangential direction, so that the guide flaps 230 respectively form a plurality of diffusion holes 240. According to the vortex diffusing means 200, the exhaust gas discharged through the diffusion holes 240, which are formed in the portion of a large diameter, is expanded while moving toward the sidewall 11 of the casing 10. On the other hand, the exhaust gas discharged through the diffusion holes 240, which are formed in the portion of a small diameter, is expanded and interferes by means of centrifugal force with the exhaust gas discharged through the diffusion holes 240, which are formed in the portion of a large diameter, while moving toward the center portion of the expansion chamber P. As a consequence, frictional heat is generated by the interference of the vortices of the two exhaust gases, resulting in attenuating the exhaust sound. The other operations of this embodiment are similar to the operations of the first embodiment. As described above, according to this embodiment, the construction of the vortex diffusing means becomes simple.

Figure 7:
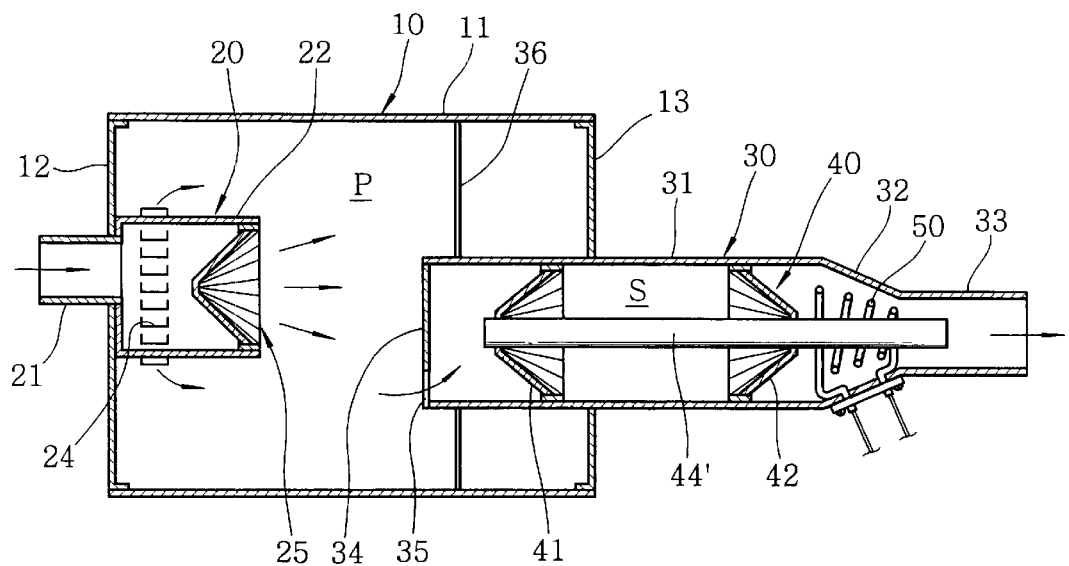
FIG. 7 is a cross section showing a muffler for an internal combustion engine according to a third embodiment of the present invention.

FIG. 7 is a cross section showing a muffler for an internal combustion engine which uses diesel fuel according to a third embodiment of the present invention. Since a casing 10, a vortex generating means 20, a vortex generating cylinder 30 and two conical vortex generating members 41 and 42 of this embodiment respectively are identical to the casing 10, the vortex generating means 20, the vortex generating cylinder 30 and the two conical vortex generating members 41 and 42 of the first embodiment in construction, the same reference numerals used to designate the components of the first embodiment are used to designate the corresponding identical components of this embodiment and the descriptions of the corresponding identical components of this embodiment are omitted. In this embodiment, the conical vortex generating members 41 and 42 are supported by a support bar 44' so that they are spaced apart from each other so as to form a vortex generating space S between them and their wider sides confront each other, and the tapered cylinder 32 is provided at its exterior end portion with a heater 50. According to this embodiment, the exhaust gas expanded in the expansion chamber P flows into the vortex generating cylinder 30 through the opening 35. The exhaust sound is attenuated by the generation of friction heat due to the interference of vortices while the exhaust gas passes through the vortex generating member 41, the vortex generating space S and the conical vortex generating member 42. Sound-attenuated exhaust gas is accelerated by the tapered cylinder 32 while the exhaust gas is moved to the heater 50. When the exhaust gas is moved to the heater 50, pollutants contained in the exhaust gas is burnt by the heater 50, thus being capable of reducing air pollution at low cost. In addition, since the exhaust gas is discharged in the form of a vortex when the exhaust gas is discharged through the tail pipe 33, the muffler of the third embodiment prevents the exhaust gas from stirring up dust, which may be stacked on the ground, when a truck goes on a construction site or an unpaved road.

Although one vortex generating cylinder 30 and one vortex generating member 40 are employed in the third embodiment, multiple vortex generating cylinders and multiple vortex generating members may be employed for an internal combustion engine having a large exhaust volume.

Industrial Applicability

As described above, the present invention provides a muffler for an internal combustion engine, which is capable of attenuating exhaust sound effectively by expanding exhaust gas twice in such a way that the exhaust gas is forced to flow vortically and by generating friction heat in such a way that the vortices of the exhaust gas are forced to interfere each other, and which is capable of preventing power output from being reduced and lessening the quantity of consumed fuel by reducing back pressure in such a way that the conversion of the flowing direction of the exhaust gas is performed without a hitch.

In addition, the present invention provides a muffler for an internal combustion engine, which is capable of reducing air pollution by burning pollutants in such a way that the muffler is simply provided with a heater and the pollutants discharged through the muffler are burnt by the heater.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A muffler for an internal combustion engine comprising:
   a casing;
   a vortex diffusing means mounted in the casing and connected to an exhaust inlet pipe;
   a vortex generating cylinder positioned in the casing at a first side and protruded into the exterior at a second side, and provided with a tail pipe at an exterior end; and
   a vortex generating member axially mounted in the vortex generating cylinder.

2. A muffler according to claim 1, wherein said vortex diffusing means consists of a diffusion cylinder connected to an interior end of an exhaust inlet pipe, a conical vortex generating member mounted in an interior end portion of the diffusion cylinder, said diffusion cylinder having a plurality of guide flaps along its circumference cut and bent tangentially whereby said guide flaps respectively form a plurality of diffusion holes.

3. A muffler according to claim 1, wherein said vortex diffusing means consists of a truncated cone-shaped diffuser, said cone-shaped diffuser having multiple lines of multiple guide flaps cut and bent tangentially whereby said guide flaps respectively form a plurality of diffusion holes.

4. A muffler according to claim 1, wherein said vortex generating cylinder consists of a cylinder, a tapered cylinder connected to said cylinder narrow toward the rear, a tail pipe with a relatively small diameter connected to the tapered cylinder, and a pressure reduction plate with an opening, said pressure reduction plate being vertically fixed to a front end of the cylinder while the opening is positioned down.

5. A muffler according to claim 1, wherein said conical vortex generating member comprises a plurality of twisted blades inwardly radially raised and radially arranged at regular intervals so as to form passages between all neighboring blades and a ring frame disposed around exterior edges of said twisted blades.

6. A muffler according to claim 2, wherein said conical vortex generating member comprises a plurality of twisted blades inwardly raised and radially arranged at regular intervals so as to form passages between all neighboring blades and a ring frame disposed around exterior edges of the twisted blades.

7. A muffler for an internal combustion engine comprising:
   a casing;
   a vortex diffusing means mounted in the casing and connected to an exhaust inlet pipe;
   a vortex generating cylinder positioned in the casing at a first side and protruded into the exterior at a second side, and provided with a tail pipe at an exterior end;
   a vortex generating member axially mounted in the vortex generating cylinder;
   a heater provided in an exterior end portion of the vortex generating cylinder.

8. The muffler according to claim 7, wherein said heater is provided at an exterior end portion of the tapered cylinder.

9. A muffler for an internal combustion engine, comprising:
   a casing;
   a vortex diffusing means mounted in the casing and connected to an exhaust inlet pipe;
   a vortex generating cylinder positioned in the casing at a first side and protruded into the exterior at a second side, and provided with a tail pipe at an exterior end; and a conical vortex generating member axially mounted in the vortex generating cylinder, said conical vortex generating member comprising a plurality of twisted blades inwardly radially raised and radially arranged at regular intervals so as to form passages between all neighboring blades and a ring frame disposed around exterior edges of said twisted blades.

10. A muffler according to claim 9, wherein said vortex diffusing means consists of a diffusion cylinder connected to an interior end of an exhaust inlet pipe, a conical vortex generating member mounted in an interior end portion of the diffusion cylinder, said diffusion cylinder having a plurality of guide flaps along its circumference cut and bent tangentially whereby said guide flaps respectively form a plurality of diffusion holes.

11. A muffler according to claim 9, wherein said vortex diffusing means consists of a truncated cone-shaped diffuser, said cone-shaped diffuser having multiple lines of multiple guide flaps cut and bent tangentially whereby said guide flaps respectively form a plurality of diffusion holes.

12. A muffler according to claim 9, wherein said vortex generating cylinder consists of a cylinder, a tapered cylinder connected to said cylinder narrow toward the rear, a tail pipe with a relatively small diameter connected to the tapered cylinder, and a pressure reduction plate with an opening, said pressure reduction plate being vertically fixed to a front end of the cylinder while the opening is positioned down.

13. A muffler according to claim 10, wherein said conical vortex generating member comprises a plurality of twisted blades inwardly raised and radially arranged at regular intervals so as to form passages between all neighboring blades and a ring frame disposed around exterior edges of the twisted blades.

* * * * *